Jan. 6, 1959      G. HIRS      2,867,325
FILTER APPARATUS

Filed Sept. 27, 1955      3 Sheets-Sheet 2

INVENTOR.
GENE HIRS.
BY
Wallace P. Lamb
ATTORNEY

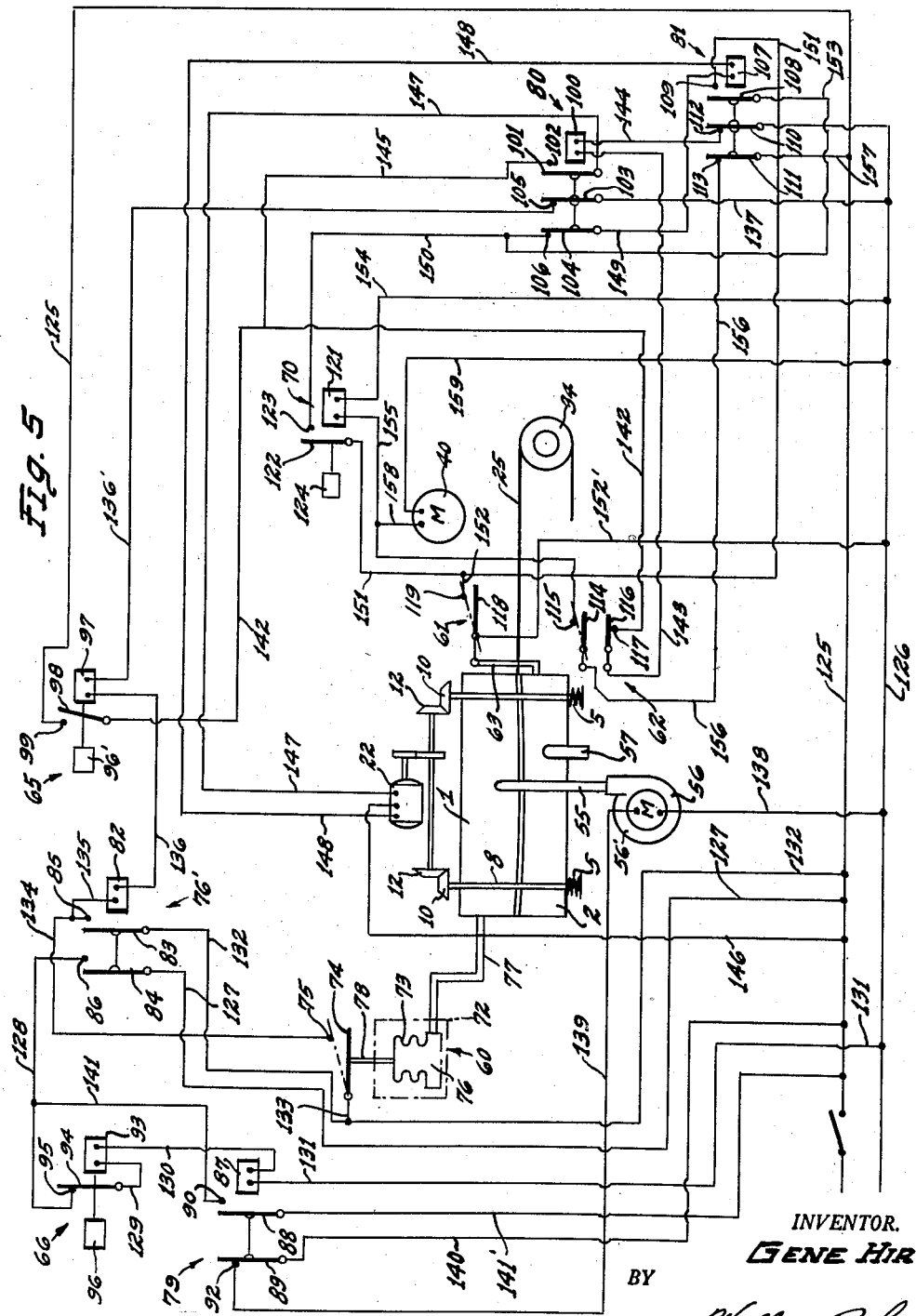

United States Patent Office 2,867,325
Patented Jan. 6, 1959

2,867,325

FILTER APPARATUS

Gene Hirs, Detroit, Mich.

Application September 27, 1955, Serial No. 536,902

12 Claims. (Cl. 210—97)

This application is a continuation-in-part of my copending application filed February 21, 1955, Serial No. 489,383 for filter apparatus, now abandoned.

The present invention pertains to a novel filter for liquid and for removing the suspended solids contained in the liquid. A filter of this type is applicable for filtering coolants for machining operations, for filtering quench oil in heat treat operations, for filtering water from paint spray booths, and is used for practically all liquids requiring the removal of suspended solids. This type of a filter is most suitable where large quantities of flowing liquid must be treated.

For example, a central coolant clarification system used in conjunction with a group of machines must process fairly large quantities of liquid. The filter disclosed herein is especially practical in an installation that must treat over 500 gallons per minute.

The principal object of the invention is to provide an apparatus that filters liquids through an intermittently fed filter fabric at pressures somewhat above atmospheric.

Another object of the invention is to provide a filter apparatus that requires a relatively small area and is capable of handling relatively large quantities of liquid. A typical dual shell filter as disclosed herein has handled as much as 3000 gallons of liquid per minute. Still another object is to provide a filter apparatus that is completely automatic in cycling and in replacing contaminated loaded filter fabric with fresh clean fabric.

In the accomplishment of these objects, the filtering apparatus or a unit thereof comprises a pair of filter shells, one over the other, and a filter fabric between the shells. One of the shells, preferably the lower one, is movable away from the other shell on attainment of a predetermined pressure in the upper shell due to loading of the filter fabric. The movement of the movable shell is accomplished by mechanism controlled by the fluid pressure in the upper shell. The same control operates a filter fabric feed and take-up mechanism, while the shells are separated, for removing the loaded length of filter fabric and inserting a fresh length between the shells. A suitable timing device stops the movement of the filter fabric and returns the movable shell to its original operative position, after which the cycle is repeated.

The invention is fully disclosed by way of example in the following description and in the accompanying drawings in which:

Figure 5 is another view like Figure 4 but showing a diagrammatic illustration of the circuitry.

Reference to these views will now be made by use of like characters which are employed to designate corresponding parts throughout.

Figure 1:
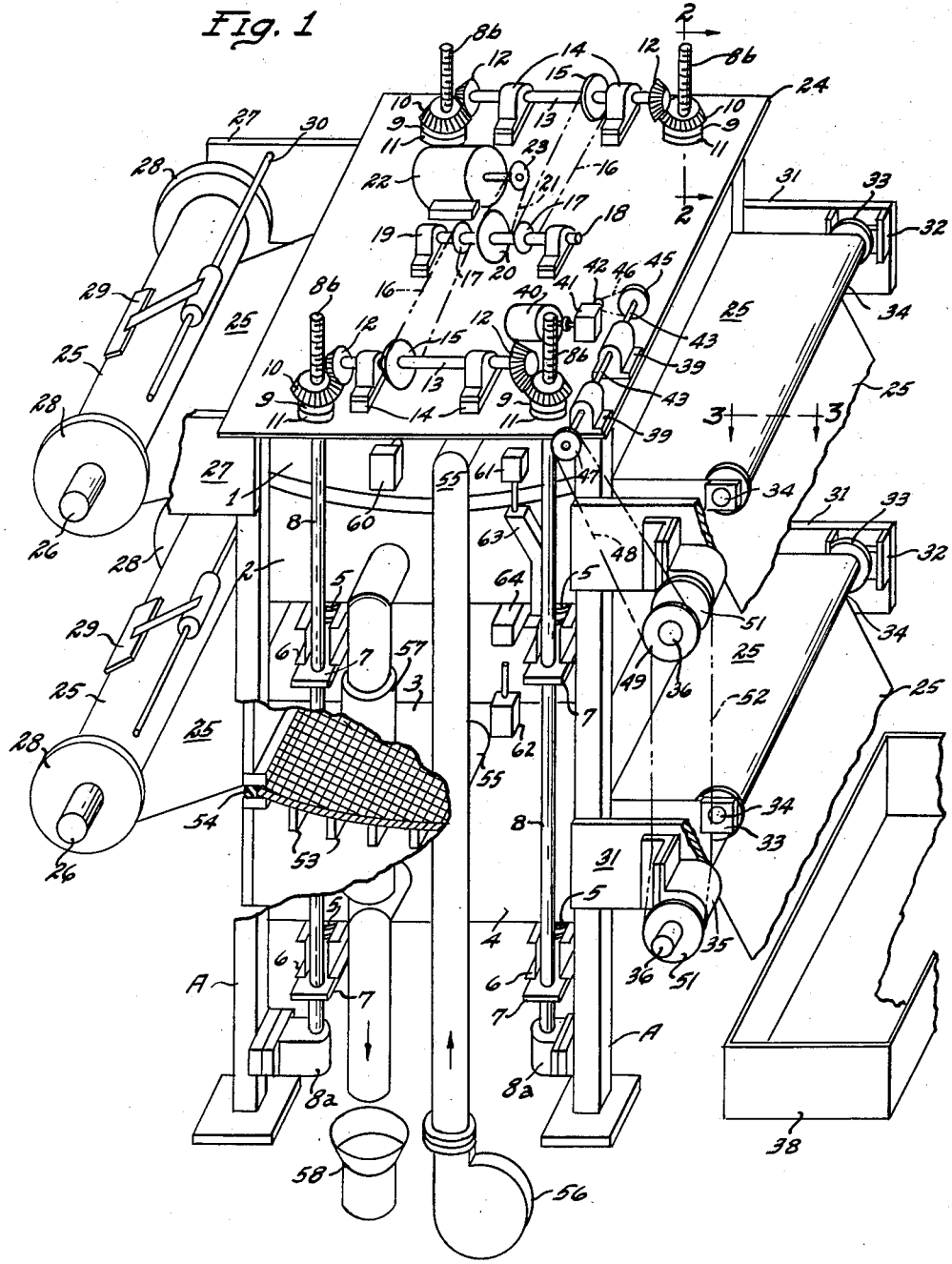
Figure 1 is a perspective view of a filtering apparatus embodying two units.
Figure 2:
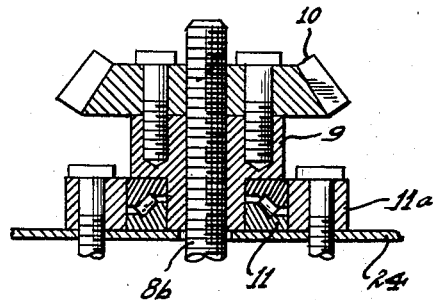
Figure 2 is a section on the line 2—2 of Figure 1.

In Figure 1 is shown a frame structure consisting essentially of vertical legs A. The apparatus here disclosed comprises two filtering units operating in unison, although more units may be built into the machine if desired. Each of such units comprises two shells one above the other, and the upper shells are designated by the numerals 1 and 3, which are welded to the legs A. The lower shells 2 and 4 are movable vertically by reason of their mounting on coil springs 5 which rest on supporting channels 6, movable vertically by mechanisms to be described. The channels 6 rest on collars 7 mounted on vertically movable tension rods 8 having their lower ends received in bearings 8a fastened to the legs A. The collars 7 prevent the rod 8 from turning beyond the small arc that brings a corner of a collar into engagement with the adjacent leg A.

The rods 8 are outside the shells 1, 2, 3, 4 and pass through a cover plate 24 on the upper end of the legs A. Above the legs the rods are threaded at 8b and engages nuts 9 attached to bevel gears 10. The nuts rest on thrust bearings 11 which is held in place by retainer 11a. A horizontal shaft 13 is mounted in bearings 14 on the plate 24 and carries bevel pinions 12 meshing with the gears 10. The threads of 8b are of opposite hand on the two ends of shaft 13. This provides similar movement to all four screws and nuts. Two such pairs of rods 8 and corresponding drive assemblies are provided for balanced support as shown in Figure 1. Each such shaft 13 carries a sprocket 15 connected by a chain 16 to another sprocket 17 on a central parallel shaft 18 mounted in bearings 19 on the plate 24. A motor 22 on the plate 24 drives a sprocket 20 on the shaft 18 through a chain 21 connected to a motor sprocket 23.

A filter fabric 25 passes between each upper shell 1, 3 and corresponding lower shell 2, 4. Since the construction is the same for each pair of shells, only one assembly need be described. Each fabric 25 is wound on a shaft 26 supported at one side of the frame structure by suitable brackets 27. Collars 28 on the ends of the shaft prevent shifting of the fabric roll. A weighted arm 29 pivoted on a stationary shaft 30 rests on the roll of fabric to prevent unrolling at random. The weight also adds some tension to the fabric before entering between the shells.

Figure 3:
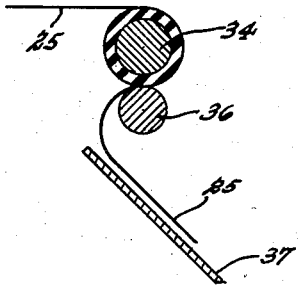
Figure 3 is a section on the line 3—3 of Figure 1.
Figure 4:
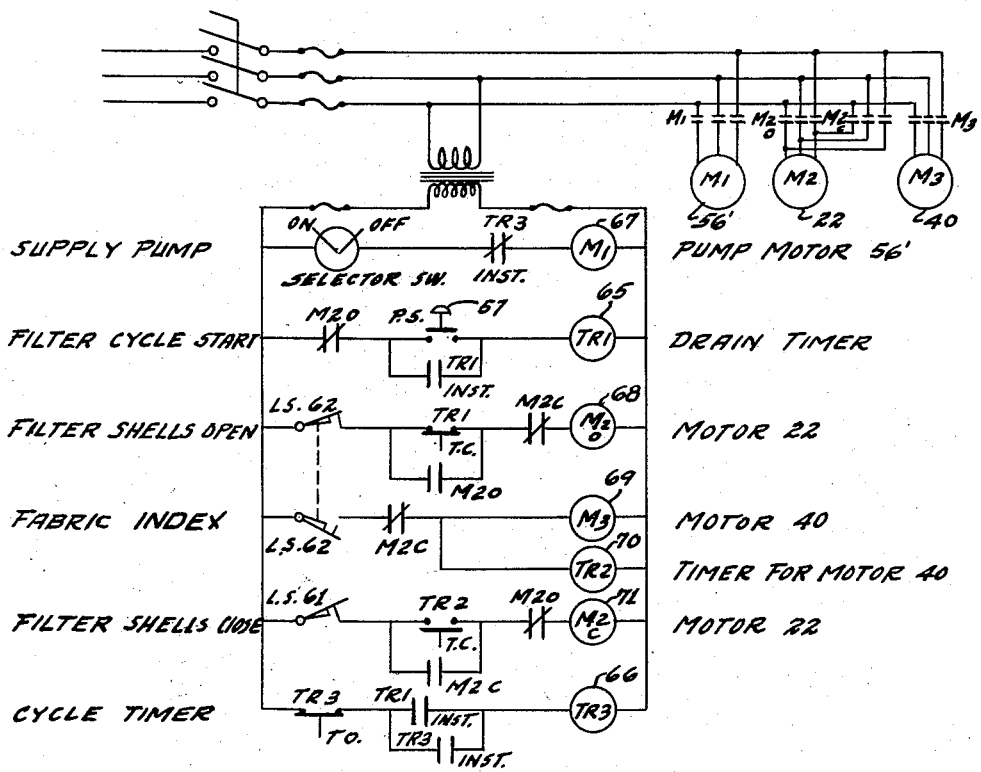
Figure 4 is a wiring diagram.

At the other side of the machine are mounted pairs of horizontally spaced brackets 31 carrying vertical guides 32. In each guide is slidably mounted a bearing 33 and a pair of opposed bearings supports a horizontal shaft 34. These shafts are preferably covered with a synthetic rubber-like material such as "Neoprene" to increase the coefficient of friction as will presently appear. The covered shafts 34 are in fact idler rolls. The brackets 31 also carry pairs of aligned bearings 35 below the rolls 34. In each pair of bearings 35 is mounted a shaft 36 bearing against the filter fabric 25 wound on the corresponding roll 34 after it has passed between the filter shells. The sheet 25 is carried inward or behind the shaft 36, as shown in Figure 3 and is then guided on an inclined slide 37 to a tote box 38.

Another motor 40 on the plate 24 drives a gear box 41 and a sprocket 42. A shaft 43 mounted in bearings 39 on the plate 24 carries a sprocket 45 jointed by a chain 46 to the sprocket 42. The shaft 43 carries another sprocket 47 connected by a chain 48 to a sprocket 49 on the upper power shaft 36. The upper and lower shafts 36 are interconnected by sprockets 51 thereon and a chain 52.

The fabric 25 between the shells is supported on a grating and attached screen 53 mounted on the top of each lower shell 2 and 4. The upper edge of each lower shell also carries a gasket 54 which functions as a seal between the upper and lower shells when they are brought together.

In the operation of the device in this position, liquid to be filtered is fed into the upper shells 1 and 3 through a supply pipe 55 charged by a pump 56 driven by motor 56'. The liquid filters through the inserted fabric 25 and screen 53 to the lower shells 2 and 4 from which it is withdrawn through a telescopic discharge pipe 57 emptying into a stand pipe or funnel 58 spaced below its lower end. This construction of the discharge conduit permits vertical movement of the shells 2 and 4 in the manner to be described.

The stationary upper sections 1 and 3 carry limit switches 61 and 62 respectively. The upper movable shell 2 carries upper and lower switch actuating brackets 63 and 64 for the switches 61 and 62 respectively. As the solids accumulate on the filter fabric and close off the fabric openings, the resistance to flow increases and the liquid pressure builds up in the top shell of the filter. When the pressure reaches a preset value the contacts of pressure responsive switch 60 are actuated and the cycle for the removal of contaminated fabric and replacement with clean filter fabric begins. Upon the actuation of the pressure responsive switch 60, a delayed action control or drain timer 65 is energized. This allows sufficient time for the liquid in the upper shells to drain out before the filter shells separate. Timer 65 instantly energizes a second delayed action control or timer 66 which controls the shut-off and starting of the filter pump 56. Timer 66 de-energizes contactor 67 which stops pump motor 56'. When the drain timer 65 has gone through its time delay and allowed the liquid to drain out, the contactor 68 is energized. This starts motor 22 which through sprockets, gears and nut drives rods 8 down and separates the filter shells. As the shells separate, bracket 64 energizes limit switch 62 which de-energizes contactor 68 and stops motor 22. At the same time, limit switch 62 closes the control circuit to energize contactor 69 and another delayed action control of timer 70. Contactor 69 starts fabric index motor 40, and timer 70 shuts it off after a pre-set time. Timer 70 at the same time energizes contactor 71 which starts motor 22 to close the filter shells. As the shells close, bracket 63 engages limit switch 61 which de-energizes contactor 71 and stops motor 22. A few seconds after the filter shells are closed, timer 66 is de-energized and starts pump 56 by energizing contactor 67 which allows pump motor 56' to operate. Liquid is then supplied by the pump to the filter and goes through the clean fabric which has just been pulled into place.

In Fig. 5, I have shown a diagrammatic illustration of my filtering apparatus, its controls and circuitry therefor. In this illustration, the various movable controls are in their normal positions or positions they will assume during filtering operation of the apparatus. The pressure responsive control 60 is represented as comprising, in general, a casing 72, a power element or bellows 73, and a switch including a movable contact or blade 74 and a fixed contact 75. In the usual manner, the bellows forms with casing 72 a pressure chamber 76 which is in communication by a conduit 77 with the interior of upper shell 1. A connecting member 78 connects the closed movable end of the bellows 73 to the movable switch blade 74 whereby expansion and contraction of the bellows will respectively make and break contacts 74, 75. While I have illustrated the pressure responsive control 60 as simply a pivoted switch blade for purposes of simplicity, it is to be understood that said switch may be of the well known snap acting type.

The pressure responsive switch 60 controls the pump 56, and also controls the shell operating motor 22. To this end, there is provided and controlled by pressure switch 60, a controlling relay 76', a pump controlling relay 79, the cycle timer 66 and a pair of motor controlling relays 80 and 81 for the reversible shell operating motor 22.

Control relay 76' includes the usual coil 82, and a pair of connected normally open switches including movable contacts or switch blades 83, 84 and cooperating fixed contacts 85 and 86 respectively. Similarly, the pump controlling relays 79 comprises a coil 87 and a pair of connected, movable switch blades 88, 89 cooperable respectively with a pair of fixed contacts 90, 92. Normally, or during filtering operation, contacts 88 and 90 are open and contacts 89 and 92 are closed, as shown.

The cycle or pump timer 66 is represented as a delayed acting relay comprising a coil 93, a switch blade 94 and a fixed contact 95. The numeral 96 designates a time delay means, such as a dash-pot to effect a time elapse before contacts 94 and 95 are broken. This timer 66 is referred to as the cycle timer as it is set to prevent resumation of the operation of pump 56 until the cycle of operations to replace the filter medium has been completed.

The drain timer 65 is similar to the above described timer 66 and is represented as a delayed acting relay having a dash-pot 96'. The relay includes the usual coil 97, a normally open switch blade 98, and a fixed contact 99. This timer 65 is set to close and actuate motor relay 80 to start motor 22 to open shell 2 after a time elapse during which it is calculated the liquid will have drained from the shell below the level of the shells separating joint.

Motor relay 80 comprises the usual coil 100, a normally open switch blade 101, and a fixed contact 102. Connected to switch blade 101 is a pair of additional and normally closed switch blades 103 and 104 cooperable respectively with a pair of fixed contacts 105 and 106, the function of these additional switches being hereinafter fully described.

Motor relay 81, like relay 80 is represented as comprising a coil 107 and a normally open switch including a movable switch blade 108 and a fixed contact 109. Connected to operate with blade 108 is a pair of normally closed switches including switch blades 110, 111, and respectively cooperating fixed contacts 112, 113.

Limit switch 62 which is actuated by the separation movement of shell 2 approaching its fully open position, is a double switch including a normally open switch blade 114 and a cooperating fixed contact 115. The other switch is normally closed and includes a switch blade 116 and cooperating contact 117. Switch 62 limits opening or downward movement of shell 2 by breaking the circuit of the motor control relay 80.

Limit switch 61 is biased to closed position, but is normally held open by abutment 63 on the movable shell 2. The limit switch 61 includes a switch blade 118 and a cooperating contact 119. This switch limits closing movement of shell 2 by breaking the circuit of the motor control relay 81.

The timer or delayed action relay 70 is provided to time operation of motor 40 so as to feed just sufficient of the clean filter medium 25 between the shells 1 and 2 to replace the used filter medium. Like the previously described timers, the delayed action relay 70 comprises a coil 121, a normally open switch including a switch blade 122, cooperating contact 123, and time delay means or dash-pot 124.

The numerals 125 and 126 designate the main lines of a source of electric current. From line 125, a lead 127 connects to control relay blade 84 which has its cooperating contact 86 connected by a lead 128 to timer contact 95. A lead 129 connects timer blade 94 to one end of timer coil 93 which has its other end connected by a lead 130 to one end of pump relay coil 87. The other end of coil 87 is connected by a lead 131 to main line 126. A lead 132 from main line 125 connects to the control relay blade 83 and a lead 133 connects the pressure switch blade 74 to lead 132 and therefor to relay blade 83. From relay contact 85, a lead 134 connects to the pressure switch contact 75. Connecting lead 134 and one end of coil 82 is lead 135 and from the other end of coil 82, a lead 136 connects to one end of the drain timer coil 97. The other end of the drain timer coil 97 is connected by a lead 136' to the motor relay contact 105, the cooperating switch blade 103 being connected by a lead 137 to the main line 126. It will be seen that lead 135 in addition to connecting the pressure switch contact 75 in series with the coil 82, provides a holding circuit with relay blade 83 to by-pass the pressure switch 60 so as to keep the coil 82 closed under certain conditions which permit the pressure switch contacts 74, 75 to part. The said conditions and purpose of holding circuit is fully described hereinafter in the description of operation of my apparatus.

From main line 126, a lead 138 connects to one terminal of pump motor 56' and from another terminal thereof, a lead 139 connects to contact 92 of the pump motor relay 79. From the switch blade 89 of relay 79, a lead 140 connects to main line 125 thus connecting the pump motor 56' and relay contacts 89, 92 across the main lines 125, 126. A lead 141 connects lead 128 and relay contact 90 to provide a holding circuit to keep the cycle timer coil 93 enegized when drain timer coil 97 becomes de-energized. A lead 141' connects switch blade 88 to main line 125.

The drain timer 65 has its contact 99 connected to the main line 125 and its switch blade 98 connected by a lead 142 to contact 116 of the limit switch 62. A lead 143 connects the limit switch blade 116 to one end of the coil 100 of the motor relay 80, the other end of coil 100 being connected by a lead 144 to contact 112 which connects through switch blade 110 to main lead 126. Thus, it will be seen that following the draining operation when timer contacts 98, 99 are closed, motor relay coil 100 will be energized closing contacts 101, 102 and opening contacts 103, 105 and 104, 106. A lead 145 connects motor relay contact 100 to lead 142.

The three lead system for the shell operating motor 22 includes a common lead 146 which connects one terminal of the motor to the main line 125. To another terminal of motor 22 a lead 147 connects to the switch blade 101 of motor relay 80 and the cooperating contact 102 is connected by the lead 145 to lead 142.

The motor control relay 81 which controls motor 22 in closing shell 2 has one end of its relay coil 107 connected by a lead 148 to the third terminal of motor 22, the other end of coil 107 being connected by a lead 149 to closed relay blade 104. The cooperating contact 106 is connected by a lead 150 to the filter medium feed or indexing timer contact 123 and the cooperating switch blade 122 is connected by a lead 151 to contact 109 of motor relay 81. To the lead 151 is connected the open contact 119 of limit switch 61 by a lead 152 and limit switch 118 is connected by lead 152' to main lead 126. From the switch blade 108 of motor relay 81, a lead 153 connects to lead 150.

The coil 121 of the timer 70 has one end connected by a lead 154 to main line 126 and has the other end of the coil connected by a lead 155 to contact 115 of limit switch 62. A lead 156 connects limit switch blade 114 to motor relay contact 113, the blade 111 being connected by a lead 157 to main line 125. A lead 158 connects one terminal of motor 40 to lead 155, and a lead 159 connects the other terminal of motor 40 to main lead 126.

GENERAL OPERATION

During filtering operation, the pump 56 operates to deliver the liquid to be filtered to the interior of upper shell 1 for passage under pressure through the filter medium between the shells, the filtered liquid discharging from outlet 57. As the filtering operation continues, foreign material filtered from the liquid accumulates on the upper surface of the filter medium within shell 1 with accompanying decrease in filtering rate and corresponding increase in pressure within shell 1. The pressure responsive control 60 is set to respond to a pressure in the upper shell 1 calculated to indicate a need of change of filter medium and disposal of the accumulated foreign matter. When this pressure is reached, pressure control switch 74 stops pump 56. After the liquid in upper shell 1 has drained to a level below the separation joint of the shells timed by timer 65, the motor 22 is energized to operate in a direction to lower shell 2. The lowering of shell 2 actuates limit switch 62 to initiate operation of motor 40 which through driving roll 34 feeds the filter medium along its path of travel, moving the used filter medium and accumulated foreign matter thereon to the disposal point and replacing the used filter medium. Operation of motor 40 is limited by the timer 70 which is set such that the filter medium is moved sufficiently to position a clean portion of the strip between shells 1 and 2. Stopping of the motor 40 initiates operation of motor 22 in the opposite direction whereby to close the shell 2 upon which operation of the liquid supply pump 56 is resumed when the cycle timer 66 acts to de-energize pump control relay coil 87.

Detail description of operation

When the pressure in upper shell 1, reaches a predetermined pressure due to accumulation of foreign matter on the filter medium, the control 60, responsive to said pressure closes its contacts 74, 75. As a result, the following circuit is completed to energize control relay coil 82 and coil 97 of the drain timer 65. From main line 125 through lead 132, lead 133, contacts 74, 75, leads 134, 135, relay coil 82, lead 136, timer coil 97, lead 136, lead 136', motor relay contacts 105, 103 and lead 137 to the other main line 126. When the above traced circuit is closed, timer 65 begins timing the drain operation and at the same time control relay contacts 83 and 85, and 84 and 86 are closed. Closing of contacts 84, 86 closes the following circuit to energize the pump control relay coil 87 and the cycle timer coil 93: From main line 125 through lead 127, closed relay contacts 84, 86, lead 128 closed timer contacts 94, 95, lead 129, timer coil 93, lead 130, pump relay coil 87 and lead 131 to the other main lead 126. When this circuit is closed, the cycle timer 66 begins its timing operation and pump relay contacts 89, 92 are instantly broken and contacts 88, 90 are instantly made. The breaking of contacts 89, 92 opens the circuit of and stops the pump motor 56' preparatory to replacing the filter medium. Engagement of contacts 88, 90 establishes the aforementioned holding circuit to hold coils 93, 87 energized after coils 82 and 97 become de-energized. When the pump 56 is stopped, to permit draining of the shells, the pressure therein decreases permitting the pressure switch contacts 74, 75 to break. However, the holding circuit including lead 135, switch blade 83 and lead 132 keep the drain timer coil 97 energized. After an elapsed interval calculated to allow for drainage of liquid from the upper shell 1, the drain timer 65 closes its contacts 98, 99 and completes the following circuit to energize the motor relay 80 to effect opening of shell 2: From main line 125, through timer contacts 99, 98, lead 142, limit switch contacts 117, 116, lead 143, motor relay coil 100, lead 144, and through the normally closed motor relay contacts 112, 110 to the other main line 126. Completion of the above circuit, closes motor relay contacts 101, 102 to complete the following circuit to the shell operating motor 22: From main lead 126, through the normally closed contacts 110, 112, lead 144, motor relay coil 100, lead 143, limit switch contacts 116, 117, leads 142 and 145, motor relay contacts 101, 102, lead 147, motor 22 and through lead 146 to the other main line 125. Also when motor relay coil 100 is energized, contacts 103, 105 are broken, re-energizing the drain timer coil 97, and contacts 104, 106 are broken. Referring to the closing by motor relay contacts 101, 102 of the circuit of a reversible motor 22, when this occurs, the motor operates in a direction to move shell 2 down, away from shell 1 preparatory to replacing the used filter medium. As shell 2 moves down, the abutment 63 carried thereby releases limit switch contact 118 which then moves into engagement with its cooperating contact 119. As the downwardly moving shell 2 approaches its fully open position, it engages and pivots the limit switch blades 114, 116. This effects engagement of limit switch contacts 114, 115 and disengagement of limit switch contacts 116, 117. The engagement of contacts 118, 119 have no immediate effect, but the breaking of contacts 116, 117 de-energizes motor relay coil 100 thereby stopping motor 22 and downward movement of shell 2, and engagement of limit switch contacts 114, and 115 effect energization of filter medium feed motor 40 and its timer 120. Thus, when the shell 2 reaches its selected, fully open position, the limit switch 62 stops motor 22, and energizes motor 40 and its timer 70 to start replacement operation of the filter medium. The circuit of the motor 40 and its timer 70 is as follows: From main line 125 through lead 157, normally closed motor relay contacts 111, 113, lead 156, closed limit switches 114, 115, lead 155, timer coil 121, and through lead 154 to the other main lead 126. Also, the circuit includes motor 40 through lead 158 from lead 155 and through lead 159 to main line 126. The motor 40 now operates to feed a new filter medium to the shells and when a clean portion of the filter strip is positioned between the shells, the motor 40 is stopped by the timer 70 closing its contacts 122, 123. When this occurs, the filter medium feed motor 40 is stopped and at the same time the shell operating motor 22 is started so as to close the shells. The circuit closed is as follows: From main line 126 through lead 152′, closed limit contacts 118, 119, lead 151, closed timer contacts 122, 123, lead 150, closed contacts 106, 104, lead 149, motor relay coil 107, lead 148 to motor 22 and from motor 22 through lead 146 to the other main line 125. Closing of the above circuit energizes motor relay 107 which closes contacts 108, 109 to start motor 22 and simultaneously breaks contacts 111, 113 to de-energize motor 40 and timer coil 121. Energizing of motor relay coil 107 also breaks contacts 110, 112.

When the motor 22 is energized as above mentioned, shell 2 is moved thereby to closed position with shell 1 and during such movement limit switch 62 is released to allow it to resume its normal position in which contacts 114, 115 are open, and contacts 116, 117 closed. As the upwardly moving shell 2 approaches its fully closed position, it engages limit switch 61, breaking contacts 118, 119 which de-energizes the motor relay coil 107 and as a consequence stops motor 22. This is followed by cycle timer 66 breaking its contacts 94, 95 which results in de-energization of the pump control relay coil 87 allowing contacts 39, 92 to engage and start the pump to continue the filtering operation. Thus, it will be understood that each time that the pressure in shell 1 increases to the pressure for which pressure switch 60 is set, a cycle of automatic operations is initiated to open the shells, replace the filter medium, close the shells and return the apparatus to filtering operation.

Although a specific embodiment of the invention has been illustrated and described, it will be understood that various alterations in the details of construction will be made without departing from the scope of the invention as indicated by the appended claims.

I claim:

1. In a fluid filter apparatus, an upper shell and a lower shell having open confronting surfaces, a supply line leading to the upper shell, a discharge leading from the lower shell, one of said shells being movable away from and toward the other shell, means responsive to pressure in one of the shells for moving said movable shell away from said other shell, means for feeding a filter medium between said shells, means responsive to movement of said movable shell away from said other shell for actuating said feeding means, and a delayed action control means for arresting said feeding means and also for returning said movable shell toward the other shell.

2. In a filter apparatus as defined in claim 1, a screen across the open top of the lower shell for supporting said filter medium.

3. In a filter apparatus as defined in claim 1, a gasket around the edge of the open surface of one of said shells.

4. In a filter apparatus as defined in claim 1, a gasket around the edge of the open surface of one of said shells, and a screen across the open top of the lower shell for supporting said filter medium.

5. In a filter apparatus a pair of shells one above the other and open at their confronting surfaces, a supply line leading to the upper shell, a discharge line leading from the lower shell, a framework enclosing said shells including a top supporting plate, a rod passed slidably and non-rotatably through said plate, a nut threaded on said rod and bearing non-slidably against said framework, one of said shells being secured to said rod to move therewith and the other shell being fixed to said framework, means responsive to pressure in the upper shell for rotating said nut to space the movable shell from the other shell, means for feeding filter fabric between said shells, means responsive to the spacing movement of said movable shell for actuating said feeding means, and timed means for arresting said feeding means and for returning said movable shell to the other shell.

6. In a filter apparatus a pair of shells one above the other and open at their confronting surfaces, a supply line leading to the upper shell, a discharge line leading from the lower shell, one of said shells being movable away from and toward the other shell, means responsive to pressure in the upper shells for spacing the movable shell from the other shell, a feed roll at one side of said shells, a take-up roll at the other side, a filter fabric extending from the feed roll to the take-up roll and passing between said shells, means for feeding said fabric from the feed roll to the take-up roll, means responsive to the spacing movement of said movable shell for actuating said feeding means, and timed means for arresting said feeding means and for returning said movable shell toward the other shell.

7. In a filter apparatus, a plurality of pairs of shells stacked vertically, each pair comprising two successive shells open at their confronting surfaces, a framework including a top supporting plate enclosing said shells, a rod passed slidably and non-rotatably through said plate, a nut screwed on said rod and bearing non-slidably against said framework, one shell of each pair being secured to said rod to move therewith and the other shell being fixed to said framework, means responsive to pressure in the upper shell for rotating said nut to space the movable shell from the other shell, means for feeding filter fabric between said shells, means responsive to the spacing movement of said movable shell for actuating said feeding means, and timed means for arresting said feeding means and for returning said movable shell to the other shell.

8. In a fluid filtering apparatus, supporting means, a pair of separable fluid conductors having communicative flow passages and opposed surfaces, a portion of a filter media disposed between said surfaces, gaskets on said surfaces displaceable to form substantially fluid tight joints with opposite sides of said filter media, one of said conductors having an inlet for fluid to be filtered and the other of said conductors having an outlet for the filtered fluid, means to deliver fluid to be filtered to said one conductor through said inlet, feed means operable to feed said filter media along a path of travel to position a clean portion of the filter media between said conductors when the conductors are separated, a control responsive to a condition of the fluid in one of said conductors and controlling separation thereof, and a control to start said feed means and operated by separation movement of said conductors through a predetermined distance to effect delayed operation of the feed means.

9. In a fluid filtering apparatus, supporting means, a pair of separable fluid conductors having communicative flow passages and opposed surfaces, a portion of a filter media disposed between said surfaces separating said flow passages, gaskets on said surfaces displaceable to form substantially fluid tight joints with opposite sides of said filter media, one of said conductors having an inlet for fluid to be filtered and the other of said conductors having and outlet for filtered fluid, means to deliver fluid to be filtered to said one conductor through said inlet, a control responsive to pressure in one of said conductors and controlling separation of said conductors, electrically operated feed means operable to feed said filter media along a path of travel to position a clean portion of the filter media between said conductor surfaces when said conductors are separated, and switch means operated by predetermined separation movement of said conductors to effect delayed starting of said feed means.

10. In a liquid filtering apparatus, supporting means, a pair of separable upper and lower liquid conductors having opposed joint forming surfaces, gaskets on said surfaces forming a substantially liquid tight separation joint, one of said conductors having a liquid inlet and the other a liquid outlet, means to feed a filter media between said conductors when separated to replace the used filter medium, a delayed action control delaying separation of said conductors to allow for drainage of the liquid therefrom until the liquid level in the lower conductor is below the separting joint, and a control responsive to a condition of the liquid in one of said conductors controlling said delayed action control.

11. In a liquid filtering apparatus, supporting means, a pair of vertically disposed separable conductors having communicating flow passages, a portion of a filter media disposed between said conductors forming substantially fluid tight joints therewith, the upper conductor having an inlet for liquid to be filtered and the lower conductor having an outlet for filtered liquid, feed means operable to feed said filter media along a path of travel to position a clean portion of the filter media between said conductors when said conductors are separated, a control controlling said feed means, a delayed action control operable to control separation of said conductors, and a control responsive to pressure in one of said conductors mutually controlling separation of said conductors with said delayed action control.

12. In a liquid filtering apparatus, supporting means, a pair of vertically disposed separable conductors having communicating flow passages, a portion of a filter media disposed between said conductors forming substantially fluid tight joints therewith, the upper conductor having an inlet for liquid to be filtered and the lower conductor having an outlet for filtered liquid, feed means operable to feed said filter media along a path of travel to position a clean portion of the filter media between said conductors when said conductors are separated, a control controlling said feed means, a delayed action control operable to control separation of said conductors, and a control responsive to pressure in one of said conductors mutually controlling separation of said conductors with said delayed action control, and a control controlling said feed means and actuated by separation movement of said conductors.

References Cited in the file of this patent

UNITED STATES PATENTS

| | | |
|---|---|---|
| 794,631 | Milne | July 11, 1905 |
| 1,766,684 | Pierce | June 24, 1930 |
| 2,250,672 | Keefer | July 29, 1941 |
| 2,296,486 | Zahn | Sept. 22, 1942 |
| 2,303,262 | Dunmire | Nov. 24, 1942 |
| 2,675,129 | Doubleday | Apr. 13, 1954 |